United States Patent
Eiha et al.

(10) Patent No.: US 7,891,965 B2
(45) Date of Patent: *Feb. 22, 2011

(54) MOLD

(75) Inventors: Noriko Eiha, Kanagawa (JP); Seiichi Watanabe, Kanagawa (JP); Yasuhito Hiraki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 479 days.

This patent is subject to a terminal disclaimer.

(21) Appl. No.: 11/650,968

(22) Filed: Jan. 9, 2007

(65) Prior Publication Data

US 2007/0166426 A1 Jul. 19, 2007

(30) Foreign Application Priority Data

Jan. 19, 2006 (JP) .............................. 2006-011515

(51) Int. Cl.
*B29D 11/00* (2006.01)
*B29C 43/04* (2006.01)

(52) U.S. Cl. .................. 425/400; 425/195; 425/395; 425/416; 425/423; 425/451.7; 425/808; 425/DIG. 129; 65/305; 65/323

(58) Field of Classification Search ................. 425/168, 425/193, 195, 352, 395, 408, 411, 412, 415, 425/423, 450.1, 466, 467, 808, 400, 416, 425/451.7, DIG. 129; 65/102, 305, 323; 264/40.5, 1.24, 1.32, 325, 2.5
See application file for complete search history.

(56) References Cited

U.S. PATENT DOCUMENTS

| | | | | |
|---|---|---|---|---|
| 3,720,491 A * | 3/1973 | Dedek | .......................... | 425/78 |
| 5,788,732 A * | 8/1998 | Nomura et al. | ................. | 65/64 |
| 6,070,436 A * | 6/2000 | Hirota et al. | .................... | 65/64 |
| 7,121,119 B2 * | 10/2006 | Sakai et al. | .................... | 65/102 |
| 7,313,930 B2 * | 1/2008 | Kainuma et al. | .............. | 65/102 |

FOREIGN PATENT DOCUMENTS

JP 2003-231159 A 8/2003

\* cited by examiner

*Primary Examiner*—Joseph S Del Sole
*Assistant Examiner*—Dimple Bodawala
(74) *Attorney, Agent, or Firm*—Sughrue Mion, PLLC

(57) ABSTRACT

A mold for molding a product in a cavity formed by closing the mold is provided. The mold includes a first half; a second half; and a plurality of aligning members which contact respective outer circumferential surfaces of a first die of the first half and a second die of the second half, at least in three directions, when the mold is closed. At least one of the aligning members is moved toward the outer circumferential surfaces of the first die and the second die, and then each of the aligning members sandwiches the first die and the second die, which enables a center axis alignment between the first die and the second die.

4 Claims, 9 Drawing Sheets

MOLD

CROSS REFERENCE TO RELATED APPLICATIONS

This application claims the benefit of Japanese Patent Application No. 2006-011515 filed on Jan. 19, 2006, the disclosure of which is incorporated herein by reference.

BACKGROUND OF THE INVENTION

1. Field of the Invention

The present invention relates to a mold for molding a product in a cavity formed by closing the mold.

2. Description of the Related Art

Optical components such as those for a digital camera, a telescopic lens, and a small-sized high-resolution camera lens for a mobile phone require a high level of accuracy in an eccentricity quantity (referred to as an interplanar eccentricity hereinafter) of each center position of two opposing optical surfaces, a lens thickness, and a shape of the optical surfaces. Of these, accuracy in the shape of the optical surfaces has almost reached a satisfactory level along with an improved accuracy in machining a mold. On the other hand, it is desired to improve accuracy in the interplanar eccentricity and in the lens thickness.

As a mold capable of manufacturing an optical component with high accuracy, for example, as shown in FIG. 9A and FIG. 9B, a mold 500 has been known which has a cavity C provided between a first half 600 and a second half 700 and formed by closing the mold 500, and a product is injection-molded in the cavity (see, for example, Japanese Laid-Open Patent Application, Publication No. 2003-231159, paragraphs 0021-0022, FIG. 1).

The first half 600 includes a first die 610 having a cavity surface 610a; and a body member 620 for holding the first die 610 from outside and having a reversely tapered part 621 on a lower end face 622 thereof on a side of the second half 700.

The second half 700 includes a second die 710 having a cavity surface 710a; and a body member 720 for holding the second die 710 from outside and having a tapered protrusion 721 on an upper end face 722 thereof on the side of the first half 600.

The mold 500 is configured such that, when the reversely tapered part 621 and the tapered protrusion 721 are fitted in with each other, a center axis alignment is achieved between the first die 610 of the first half 600 and the second die 710 of the second half 700.

In the conventional mold 500 described above, as shown in FIG. 9A, if a space S1 is left between the lower end face 622 of the first half 600 and the upper end face 722 of the second half 700, accuracy in the thickness of a product is lowered. Further, if the space S1 is relatively large, a material fed into the cavity C may flow out through the space S1, which results in generating a burr on the molded product. Therefore, as shown in FIG. 9B, the mold 500 is designed so as not to leave any space between the lower end face 622 of the first half 600 and the upper end face 722 of the second half 700, when the mold 500 is closed.

However, if the mold 500 is machined so as to contact the lower end face 622 of the first half 600 with the upper end face 722 of the second half 700, it is difficult to make an inclination of a tapered face of the reversely tapered part 621 exactly the same as that of the tapered protrusion 721, due to an influence of dimensional tolerance during machining. Thus a space S2 in a lateral direction may be disadvantageously left between the tapered faces on the reversely tapered part 621 and the tapered protrusion 721, which results in an inaccurate center axis alignment between the first die 610 and the second die 710 to thereby lower the accuracy in the interplanar eccentricity of the molded product.

As described above, there is a problem in the conventional mold 500 that it is difficult to improve accuracy both in the lens thickness and in the interplanar eccentricity of the product, lowering accuracy in molding the product.

It is desirable to provide a mold having an improved accuracy both in the lens thickness and in the interplanar eccentricity of a product.

SUMMARY OF THE INVENTION

The present invention provides a mold for molding a product in a cavity formed by closing the mold. The mold includes a first half, which includes a first die to be inserted therein to; and a second half, which includes a second die to be inserted therein to. The first die and the second die are configured to be joined together to form a surface of the cavity C; and a plurality of aligning members which contact respective side circumferential surfaces of the first die and the second die at least in three directions. At least one of the aligning members is moved toward respective side circumferential surfaces of the first die and the second die to then contact the aligning members with the same. Thus each of the aligning members sandwiches the first die and the second die, which enables the center axis alignment between the first die and the second die.

In the mold described above, accuracy in the center axis alignment between the first die and the second die can therefore be provided without being affected by the dimensional tolerance of each contact part of the first die and the second die. By contrast, in the conventional mold, each contact part of the first die and the second die provides the center axis alignment therebetween. The mold according to the present invention can be therefore configured such that the first die and the second die are pressed against each other, leaving no space therebetween in a mold opening/closing direction. This enables an improved accuracy in the lens thickness and in the center axis alignment therebetween, resulting in an improved accuracy both in the lens thickness and in the interplanar eccentricity of the product.

Further, there is no need of machining a contact part such as a tapered part and a reversely tapered part on the first die and the second die with high precision, which enables a cost reduction in manufacturing the mold.

It is to be noted that the expression "when the mold is closed" used herein includes not only a state in which the first half and the second half are completely closed and a mold clamping force is applied thereto, but also a state in which the first half and the second half are in the course of being closed. That is, in the present invention, the aligning members can contact respective side circumferential surfaces of the first die and the second die, also while the first half and the second half are in the course of being closed. In this case, the first die and the second die, and the aligning members slide in contact with each other. On the other hand, if the aligning members contact the respective side circumferential surfaces of the first die and the second die after the first half and the second half are completely closed, the first die and the second die, and the aligning members would not slide in contact with each other.

In the mold described above, each side circumferential surface on the first die and the second die may have at least three pairs of reference parts, a pair of which is flush with each other when a center axis alignment between the first die and the second die is performed; and each aligning members may have a contact part for closely contacting a pair of the reference parts.

In this configuration, each contact part of the aligning members for closely contacting the reference parts, at which the side circumferential surface of the first die is flush with that of the second die, is machined in a linear form along a mold opening/closing direction. Thus each contact part of the aligning members can be easily machined with high accuracy to thereby improve accuracy in machining the aligning members, enabling a cost reduction in the machining.

It is to be noted that the reference parts and the contact parts may be closely contacted with each other in a linear form, a planar form, or any other form without limitation.

In the mold described above, the aligning members may move in a vertical direction with respect to a moving direction of the first die and the second die.

If the aligning members move in a vertical direction with respect to the moving direction of the first die and the second die, a mechanism for moving the aligning members can have a simpler configuration.

In the mold described above, each aligning member may have a tapered face for guiding the same toward respective side circumferential surfaces of the first die and the second die. When each aligning member slides along the tapered face, each aligning member can contact respective side circumferential surfaces of the first die and the second die.

In this configuration, since each aligning member has a tapered face for guiding the same toward respective side circumferential surfaces of the first die and the second die, each aligning member to which a force is applied in a mold closing direction can move toward respective side circumferential surfaces of the first die and the second die. This is particularly advantageous when a plurality of the molds are arranged, allowing an increase in the number of the molds which can be arranged in a given area.

The tapered face for guiding the aligning members toward respective side circumferential surfaces of the first die and the second die includes, but not limited to, a conic surface and a planar tapered face formed around the first die and the second die.

Further, all the aligning members may be attached to a single monolithic member, which can move all the aligning members at the same timing.

In the configurations described above of the present invention, a mechanism to move the aligning members includes, for example, various types of actuators such as various direct acting cylinders (an air cylinder, a hydraulic cylinder, a solenoid coil, or the like), a piezoelectric element, and a spring member. Also by utilizing a force acting when the mold is closed, the aligning members may be pushed along each tapered face formed on the first die or the second die, when the first die or the second die is moving in the mold closing direction. Further, the mechanism to move the aligning members is not limited to the aforementioned, but may include those which use a restoring force of a shape memory alloy, or an expansive force of a fluid such as air injected into hollow members provided in the first die and the second die.

Other features and advantages of the present invention will become more apparent from the following detailed description of the invention, when taken in conjunction with the accompanying exemplary drawings.

BRIEF DESCRIPTION OF THE DRAWINGS

FIG. 1A is a plan view showing the mold before a center axis alignment is performed. FIG. 1B is a cross sectional view showing the mold when cut along the line A-A in FIG. 1A.

FIG. 2A is a plan view showing the mold after the center axis alignment is performed. FIG. 2B is a cross sectional view showing the mold when cut along the line B-B in FIG. 2A.

FIG. 5A is a plan view showing the mold in which a contact surface of each aligning member is curved. FIG. 5B is a plan view showing the mold in which each contact surface of the aligning members is V-shaped when viewed from above.

FIG. 7A is a plan view showing the mold before a center axis alignment is performed. FIG. 7B is a cross sectional view showing the mold after a center axis alignment is performed.

FIG. 9A is a cross sectional view showing a state where a space is left between two halves in a mold opening/closing direction. FIG. 9B is a cross sectional view showing the state where a space is left between the two halves in a lateral direction.

DETAILED DESCRIPTION OF EXEMPLARY EMBODIMENTS

Figure 1A:
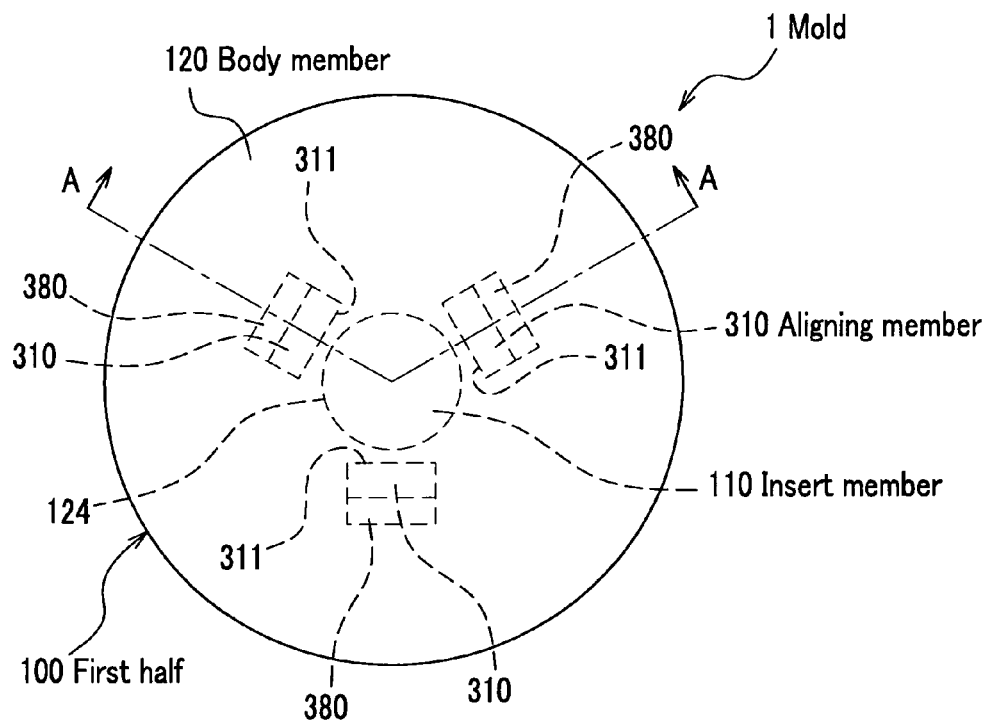
FIG. 1A and FIG. 1B are views each showing a mold according to a first embodiment of the present invention.

With reference to the attached drawings, a first embodiment of the present invention is described next in detail.

It is to be noted that the same reference numerals are assigned to the same components in embodiments to be described hereinafter, and overlapped descriptions are omitted.

In this embodiment, the description is made assuming that the present invention is applied to manufacturing a plastic optical lens (hereinafter referred to as a lens).

First Embodiment

First is described a configuration of a mold according to a first embodiment.

Figure 1B:
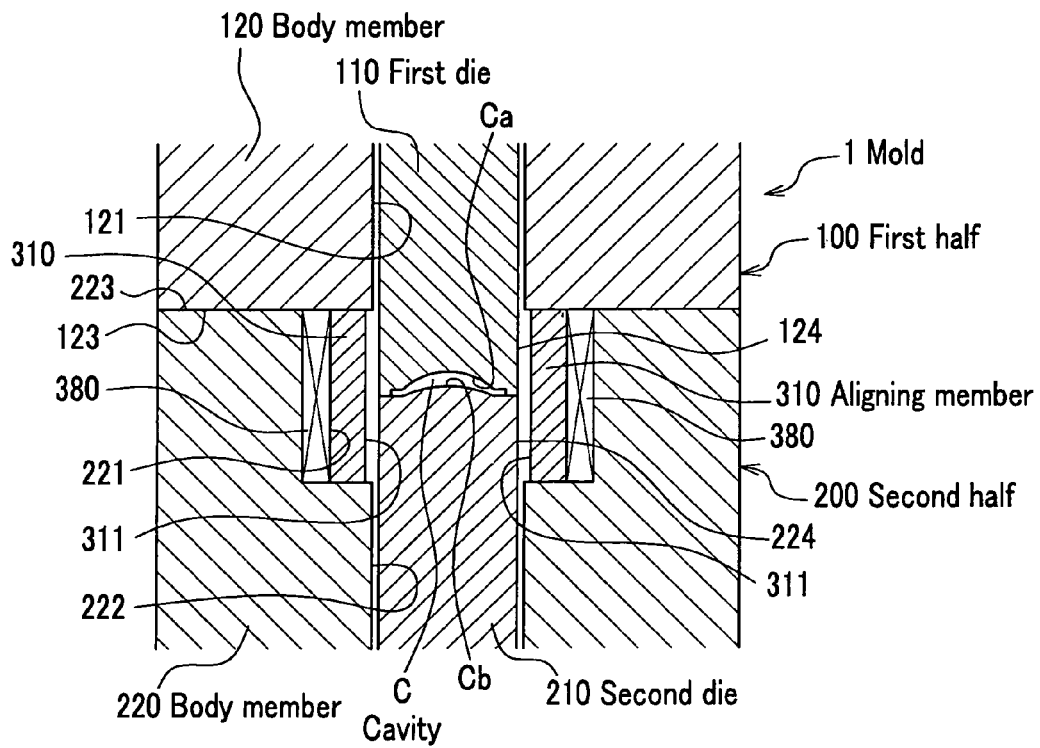
Figure 2A:
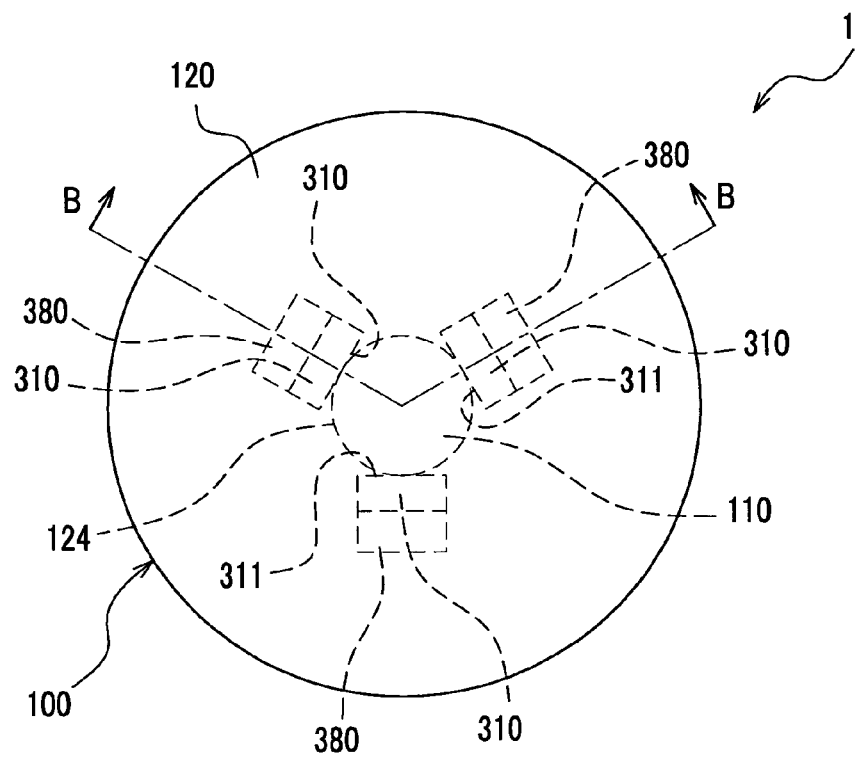
FIG. 2A and FIG. 2B are views each showing the mold according to the first embodiment.
Figure 2B:
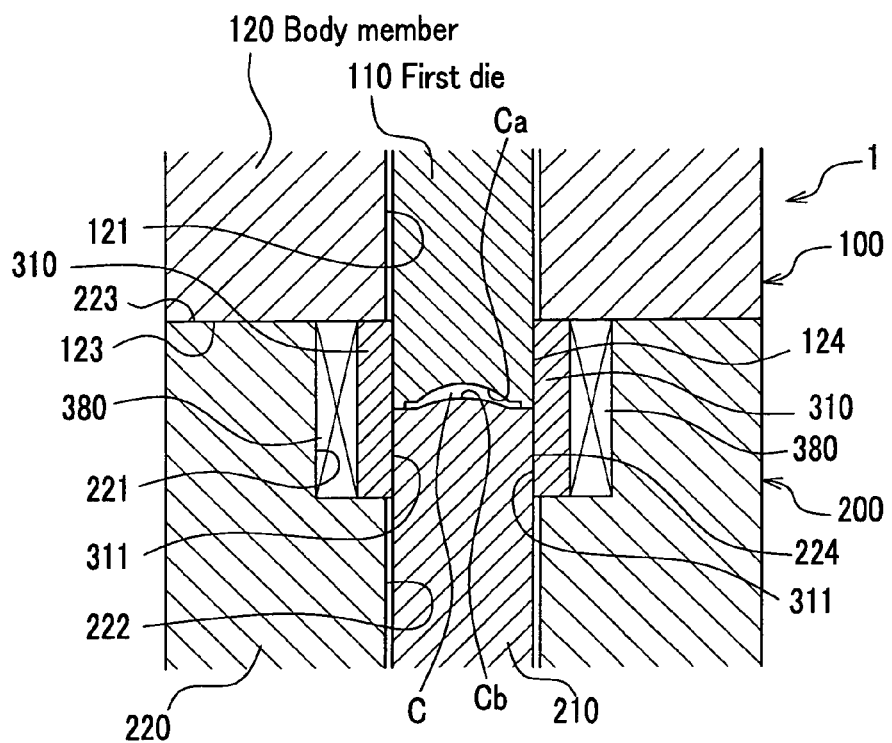

In the drawings to be referred to, FIG. 1A and FIG. 1B are views each showing a mold according to the first embodiment of the present invention. FIG. 1A is a plan view showing the mold before a center axis alignment is performed. FIG. 1B is a cross sectional view showing the mold when cut along the line A-A in FIG. 1A. FIG. 2A and FIG. 2B are views each showing the mold according to the first embodiment. FIG. 2A is a plan view showing the mold after the center axis alignment is performed. FIG. 2B is a cross sectional view showing the mold when cut along the line B-B in FIG. 2A.

As shown in FIG. 1A and FIG. 1B, a mold 1 according to the first embodiment includes a first half 100, which includes a first die 110 to be inserted therein to; and a second half 200, which includes a second die 210 to be inserted therein to. The first die 110 and the second die 210 are configured to be joined together to form a cavity C when the mold 1 is closed, and a lens L (which may be also referred to as "product") is molded in the cavity C. In the first embodiment, the first half 100 moves in the vertical direction with respect to the second half 200 (also in the vertical direction in FIG. 1B), and thus the first half 100 and the second half 200 can be joined with or separated from each other. The mold 1 also includes a plurality of aligning members 310 for performing the center axis alignment between the first die 110 and the second half 210.

The first half 100 includes, as shown in FIG. 1A and FIG. 1B, a first die 110 having a cavity surface Ca on a lower end thereof; and a body member 120 into which the first die 110 is inserted.

The first die 110 is a metal member in a column-like shape, and can be separated from the body member 120. As described above, the first die 110 has the cavity surface Ca on the lower end thereof.

The body member 120 is a metal member for holding the first die 110 from outside, and has a cylindrical form and a hollow in the center thereof.

The hollow of the body member 120 includes an opening 121 for loosely fitting in with an upper part of the first die 110. A lower end of the opening 121 opens on a lower end surface 123 of the body member 120. When the first die 110 is inserted into the opening 121, the cavity surface Ca provided on the lower end of the first die 110 protrudes from the lower end surface 123 of the body member 120.

The first half 100 includes an ejecting mechanism for demolding a lens from the cavity surface Ca of the first die 110, after the lens is molded in the cavity C, and then the first half 100 and the second half 200 are opened. The ejecting mechanism used herein may have any one of various known configurations, and is not shown in this embodiment.

The second half 200 includes, as shown in FIG. 1B, a second die 210 having a cavity surface Cb on an upper end thereof; and a body member 220 into which the second die 210 is inserted. The second half 200 is provided opposing to the first half 100.

It is to be noted that a detailed description of the same configuration of the second half 200 as that of the first half 100 is omitted herefrom.

The cavity surface Cb is provided on the upper end of the second die 210 as described above. The hollow of the body member 120 includes a thick hole 221 loosely fitting in with the upper part of the second die 210 and a thin hole 222 loosely fitting in with the lower part of the second die 210. The thick hole 221 has a larger diameter than that of the thin hole 222. When the second die 210 is fitted in with the thick hole 221 and the thin hole 222 of the body member 220, the upper end of the second die 210 protrudes from the thin hole 222 into the thick hole 221, so that the cavity surface Cb provided on the upper end of the second die 210 is exposed on an upper end surface 223 of the body member 120.

It is to be noted that the first die 110 of the first half 100 has the same diameter as that of the second die 210 of the second half 200. If the first and second dies 110, 210 are joined together when the center axis alignment therebetween is achieved, the configuration is such that an outer circumferential surface 124 (which may be also referred to as a "side circumferential surface") of the first die 110 is flush with an outer circumferential surface 224 (which may be also referred to as another "side circumferential surface") of the second die 210. As described above, a pair of the outer circumferential surfaces 124, 224, which are flush with each other when the center axis alignment between the first die 110 and the second die 210 is achieved, is used as a reference part. In the first embodiment, each entire circumference of the outer circumferential surfaces 124, 224 of the first and second dies 110, 210 is taken as a reference part. However, the reference part may be any parts on the outer circumferential surfaces 124, 224 with which the aligning members 310 hereinafter described are contacted.

The first half 100 also includes a sprue for feeding a molten plastic material from a nozzle of a molding machine not shown. The second half 200 also includes a runner, a gate, and the like, all of which are not shown in this embodiment, for feeding the molten plastic resin from the sprue to the cavity C.

The aligning members 310 are provided to achieve the center axis alignment between the first die 110 and the second die 210 (see FIG. 2A). It is to be noted that the center axis alignment between the first half 100 and the second half 200 can be achieved not by adjusting an entire position of the first half 100 and the second half 200, but by aligning the center axis of the first die 110 and the second die 210, between which is the cavity C is formed.

As shown in FIG. 1A and FIG. 1B, each aligning member 310 is a metal member in a rectangular solid shape, which contacts the outer circumferential surface 124 of the first die 110 of the first half 100 and the outer circumferential surface 224 of the second die 210 of the second half 200, when the mold 1 is closed. Three aligning members 310 are herein provided inside the thick hole 221 of the second half 200 at intervals of 120 degrees along each outer circumference of the first and second dies 110, 210, and contact respective outer circumferential surfaces 124, 224 of the first and second dies 110, 210 in three directions.

Each aligning member 310 has a contact surface 311 facing to the inside of the mold 1, as shown in FIG. 2A and FIG. 2B, which has a planar shape in parallel with the mold opening/closing direction. The contact surface 311 includes a contact part which closely contact, in parallel with the mold opening/closing direction and in a linear form, a pair of the outer circumferential surfaces 124, 224 (the reference parts), which are flush with each other when the center axis alignment between the first and second dies 110, 210 is achieved.

Each of the aligning members 310 can move in the vertical direction with respect to the mold opening/closing direction by a driving unit 380 provided inside the thick hole 221 of the second half 200.

Various known techniques can be used without limitation for the driving unit 380 to move each of the aligning members 310. In the first embodiment, an actuator such as an air cylinder is used to move each of the aligning members 310, after the first half 100 and the second half 200 are closed together.

When each of the aligning members 310 is moved toward the outer circumferential surfaces 124, 224 of the first and second dies 110, 210 after the mold 1 is closed, if the center axes of the first die 110 and the second die 210 are out of alignment, only one or two of the aligning members 310 press the outer circumferential surfaces 124, 224 (the reference parts) of the first and second dies 110, 210. The first and second dies 110, 210 are thereby sandwiched by each of the aligning members 310 and are moved in a lateral direction. Then the contact parts of respective aligning members 310 contact the outer circumferential surfaces 124, 224 (the reference parts) of the first and second dies 110, 210 in three directions, and the center axis of the first die 110 and that of the second die 210 are aligned to thereby achieve the center axis alignment therebetween.

Then, a mold clamping force is applied to the first half 100 and the second half 200 to firmly press the first die 110 and the second die 210 against each other.

At this time, the lower end of the first die 110 and the upper end of the second die 210 are pressed against each other with a slight space left therebetween. This prevents the lower end of the first die 110 and the upper end of the second die 210 from rubbing against each other and getting damaged, when the center axis alignment therebetween is performed. Further, since a plastic material for molding a plastic optical lens, such as polycarbonate, polyester and acryl, is high in viscosity, the plastic material fed into the cavity C will not flow out through the space between the lower end of the first die 110 and the upper end of the second die 210.

If the space between the lower end of the first die 110 and the upper end of the second die 210 is too large, accuracy in the lens thickness is lowered, therefore, a width of the space is preferably 3 μm or less, and more preferably, 1 μm or less. If no space is provided between the lower end of the first die 110 and the upper end of the second die 210, even when a mold clamping force is applied to the first half and the second half 100, 200, the first and second dies 110, 210 cannot be moved in any direction, or the lower end of the first die 110 and the upper end of the second die 210 are rubbed against each other to be worn down.

The mold 1 configured as described above according to the first embodiment can provide advantages as follows.

Figure 9A:
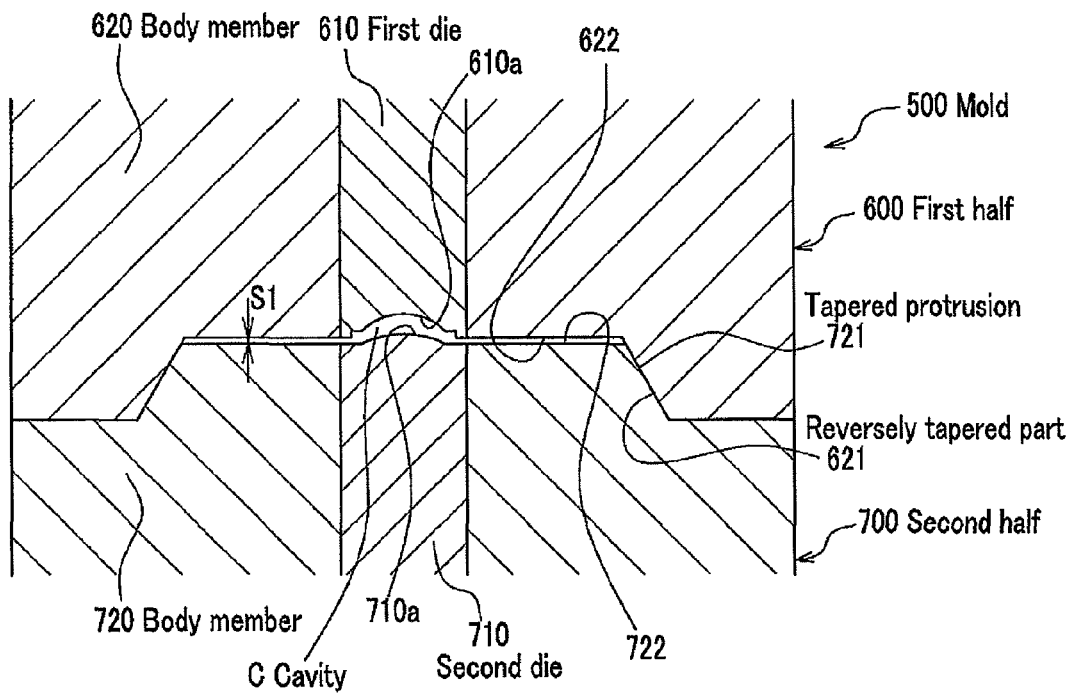
FIGS. 9A and 9B are views each showing a mold according to the conventional technology.
Figure 9B:
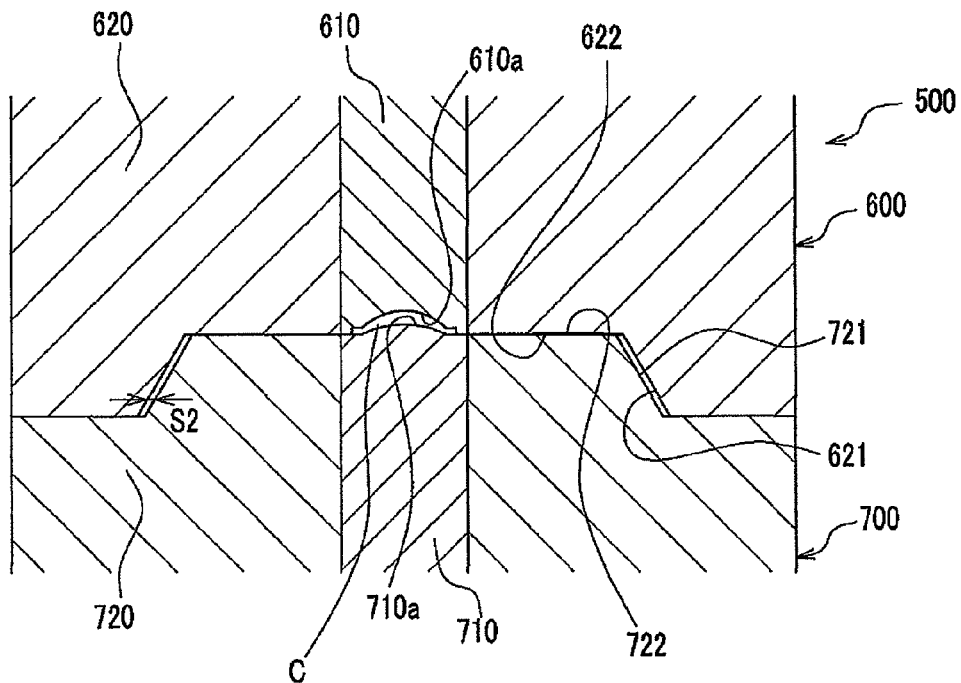

In the mold 1 according to the first embodiment, as shown in FIG. 2A and FIG. 2B, the aligning members 310, which contact the outer circumferential surfaces 124, 224 (the reference parts) of the first and second dies 110, 210 in three directions, achieve the center axis alignment between the first and second dies 110, 210. On the other hand, in the conventional mold (see FIG. 9), the fitted parts of the first half 100 and the second half 200 are designed to provide the center axis alignment of the first die 110 and the second die 210. That is, the center axis alignment therebetween according to the first embodiment can be provided without being affected by the dimensional tolerance of the fitted parts of the first half 100 and the second half 200.

Thus, in the mold 1 according to the first embodiment, the first die 110 and the second die 210 are configured to be firmly joined together, leaving no space therebetween in the mold opening/closing direction. This enables an improved accuracy in the lens thickness and in the center axis alignment therebetween, namely, the interplanar eccentricity.

Further, unlike the conventional mold (see FIG. 9), there is no need of machining with high precision the fitted parts such as a tapered protrusion and a reversely tapered part on the first half 100 and the second half 200, which facilitates manufacture of the first half and the second half 100, and resultantly enables a cost reduction in manufacturing the mold 1.

In the mold 1 according to the first embodiment, each of the aligning members 310 is pressed against the outer circumferential surfaces 124, 224 of the first and second dies 110, 210, after the first half 100 and the second half 200 are completely closed. This prevents each of the aligning members 310 and the outer circumferential surfaces 124, 224 of the first and second dies 110, 210 from sliding in contact with each other and thus from being damaged.

The aligning members 310 are configured to move in the vertical direction with respect to the mold opening/closing direction (namely, in the lateral direction). That can make a mechanism to move the aligning members 310 simpler.

The contact surface 311 of each of the aligning members 310 for closely contacting the reference parts, at which the outer circumferential surfaces 124, 224 of the first and second dies 110, 210 are flush with each other, has a linear form along the mold opening/closing direction. Thus the contact surface 311 of each the aligning members 310 can be easily machined with high precision to thereby improve accuracy in machining the aligning members 310, and also to reduce a cost in the machining.

The first embodiment according to the present invention has been described above in detail with reference to the related drawings, however, the present invention is not limited to the first embodiment, and can be modified according to the necessity without departing from the gist of the present invention.

For instance, in the first embodiment, an example is described in which the present invention is applied to a mold for manufacturing a lens, however, the present invention is not limited to this, and can be applied to a mold for manufacturing, for example, a frame for holding a lens.

In the first embodiment, as shown in FIG. 2A, three aligning members 310 contact the outer circumferential surfaces 124, 224 of the first and second dies 110, 210 in three directions, which enables the center axis alignment between the first and second dies 110, 210. However, more than three aligning members 310 can be provided, because, as long as the aligning members 310 contact the first and second dies 110, 210 at least in three directions, the center axis alignment therebetween can be achieved.

Figure 3:
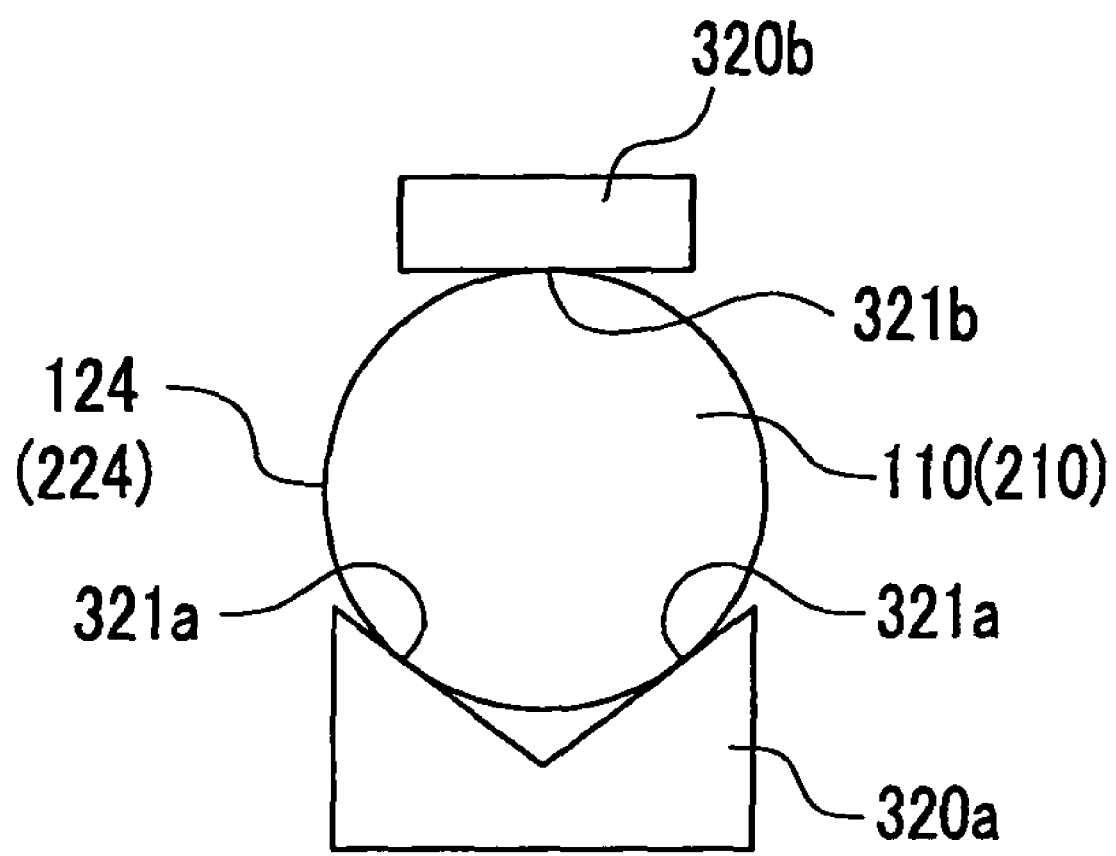
FIG. 3 is a cross sectional view showing a mold having another configuration according to the first embodiment, in which two contact surfaces are provided on one aligning member.

In the first embodiment, as shown in FIG. 1A, one aligning member 310 has one contact surface 311. However, as shown in the plan view of FIG. 3, a configuration is available in which an aligning member 320a provided with two contact parts 321a, 321a and an aligning member 320b provided with one contact part 321b sandwich the first and second dies 110, 210.

Figure 4:
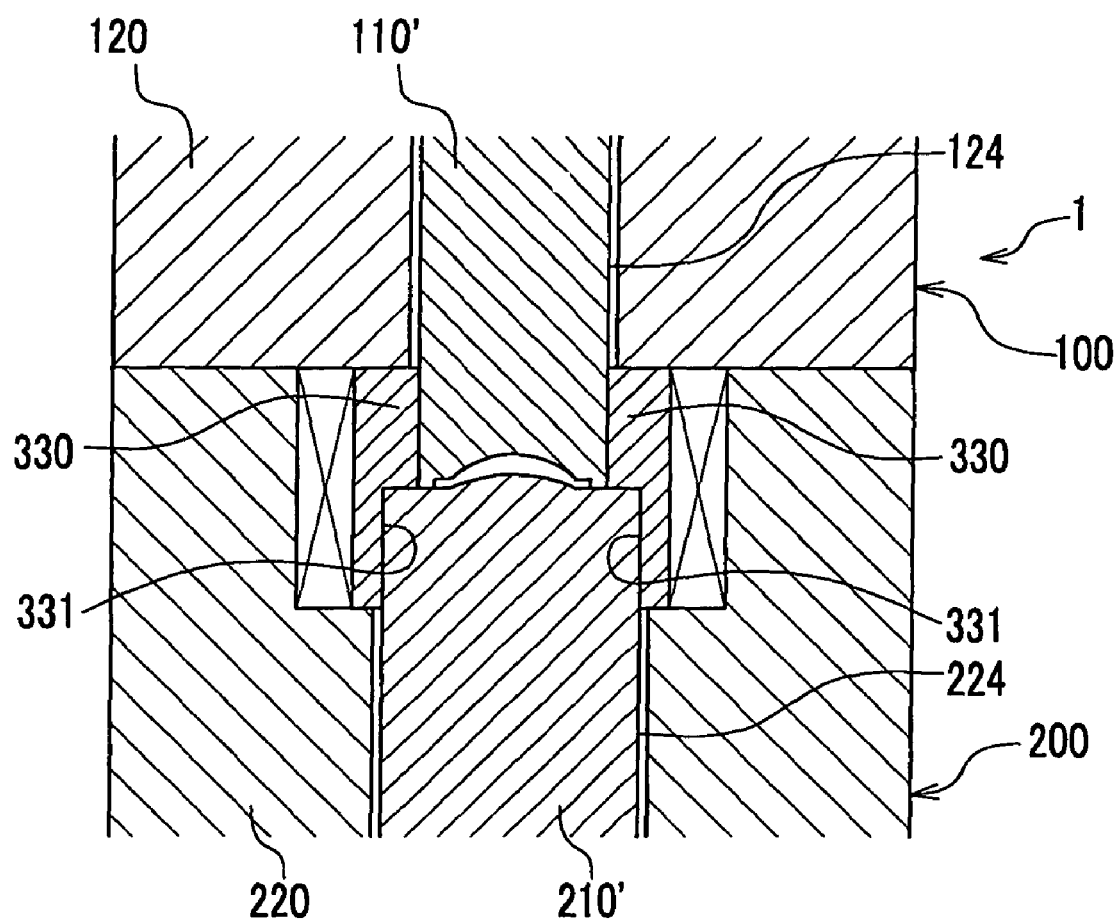
FIG. 4 is a cross sectional view showing a mold having a still another configuration according to the first embodiment, in which a contact surface of each aligning member is provided with a stepped part.

In the first embodiment, as shown in FIG. 2B, each contact surface 311 of the aligning members 310 contacts the outer circumferential surfaces 124, 224, which are flush with each other when the center axis alignment between the first and second dies 110, 210 is achieved. However, as shown in the cross sectional view of FIG. 4, the present invention can be applied to a case in which a diameter of an first die 110' is different from that of a second die 210'. In this case, each contact surface 331 of the aligning members 330 includes a stepped part corresponding to a step on which the first and second dies 110', 210' are pressed against each other, so that each contact surface 311 of the aligning members 310 closely contacts respective outer circumferential surfaces 124, 224 of the first and second dies 110', 210'.

It is to be noted that, if the stepped part of each contact surface 311 is provided in a position above the step on which the first and second dies 110', 210' are pressed against each other, the stepped part of each contact surface 311 and the above-mentioned step are not directly fitted in with each other. Hence, there is no need of machining each stepped part of the aligning members 310 with high precision, which enables an easy machining of the aligning members 310.

In the first embodiment, three aligning members 310 are moved as shown in FIG. 2A and FIG. 2B. However, at least one of the aligning members 310 may be moved so as to press the first and second dies 110, 210 in between the three aligning members 310. Thus the aligning members 310 can contact the outer circumferential surfaces 124, 224 of the first and second dies 110, 210 in three directions.

In the first embodiment, as shown in FIG. 2B, an actuator (not shown) such as an air cylinder is used as the driving unit 380, however, various actuators can be used without limitation, such as, for example, a hydraulic cylinder, a solenoid coil, a piezoelectric element, and a spring member.

The aligning members 310 (see FIG. 1B) can be configured to be pushed by a restoring force of a shape memory alloy provided in the body members 120, 220 of the first half 100 and the second half 200 respectively, or by an expansive force of a fluid such as air injected into hollow members provided in the body members 120, 220.

Figure 5A:
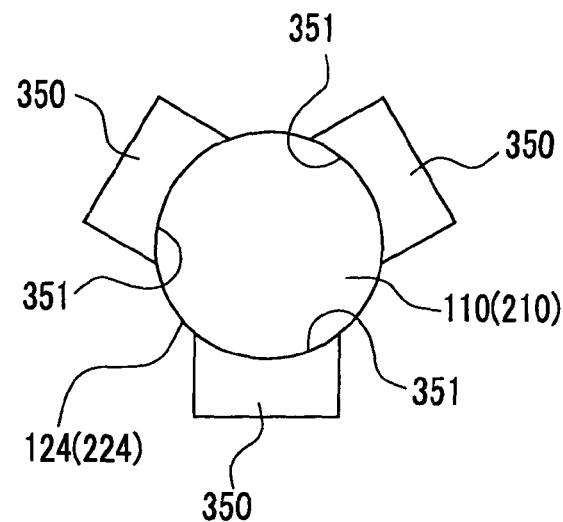
FIG. 5A and FIG. 5B are views each showing a mold having another configuration according to the first embodiment.

In the first embodiment, as shown in FIG. 2B, each contact surface 311 of the aligning members 310 is a plane surface in parallel with the mold opening/closing direction. However, like aligning members 350 shown in the plan view of FIG. 5A, each contact surface 351 having a curved surface in the form of a circular arc can be formed along the outer circumferential surfaces 124, 224 of the first and second dies 110, 210 having a circular cross section. With this configuration, the curved contact surface 351 has a larger contact surface than the planar contact surface 311 (see FIG. 2B), and thus the aligning members 350 can be accurately pressed against the outer circumferential surfaces 124, 224 of the first and second dies 110, 210. It is to be noted that a curvature of each contact surface 351 is preferably larger than those of the outer circumferential surfaces 124, 224 of the first and second dies 110, 210. This advantageously makes it difficult for an edge in a circumferential direction of each contact surface 351 to contact the outer circumferential surfaces 124, 224 of the first and second dies 110, 210. This also enables the contact surface 351 to press the outer circumferential surfaces 124, 224 of the first and second dies 110, 210 in a specific direction.

Figure 5B:
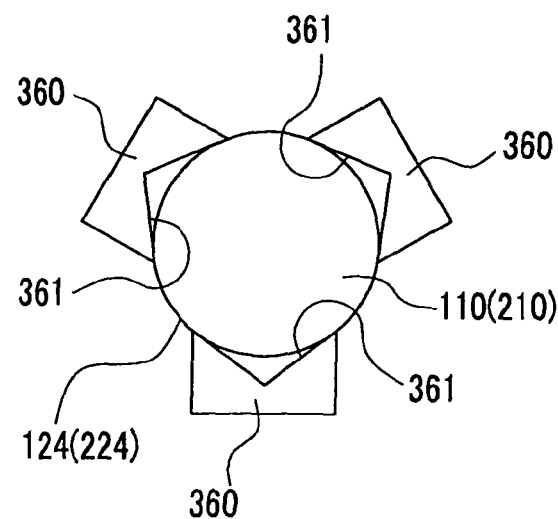

Further, aligning members 360 shown in the plan view of FIG. 5B can be employed each of which has a contact surface 361 in a V shape when viewed from above, into which portions of the outer circumferential surfaces 124, 224 of the first and second dies 110, 210 are accommodated.

In the first embodiment, as shown in FIG. 2B, when the center axis alignment between the first and second dies 110, 210 is performed, both the first half 100 and the second half 200 are moved in the lateral direction. However, the center axis alignment between the first and second dies 110, 210 can also be performed, even when one of the two halves is fixed, and the other half is moved to the fixed half. In this configuration, three aligning members 360 are moved in order to move the other half.

In the first embodiment, as shown in FIG. 1B, a vertical molding machine is used in which the first half 100 and the second half 200 move in the vertical direction. However, a horizontal molding machine can also be used in which the first half 100 and the second half 200 are moved in the horizontal direction. In this case, gravity force is not applied to press one of the two halves (an upper positioned half) against the other (a lower positioned half), which can prevent contact parts of the first and second dies 110, 210 from wearing down when the center axis alignment therebetween is performed after the mold is closed.

In the first embodiment, as shown in FIG. 1B, the aligning members 310 and the driving unit 380 are provided in the second half 200, but can be provided in the first half 100.

Each shape of the body members 120, 220 of the first half 100 and the second half 200 is not limited to be a cylinder, and may have various shapes such as a prism.

In the first embodiment, the thick hole 221 and the thin hole 222 provided in the second half 200 have diameters different from each other. However, the thick hole 221 and the thin hole 222 may have the same diameter.

One mold 1 may have a plurality of cavities C inside.

An ejecting mechanism for demolding a lens from the cavity surface Ca of the first die 110, after the mold 1 is opened, is provided in the first half 100. However, the ejecting mechanism can be provided in the second half 200.

Figure 6:
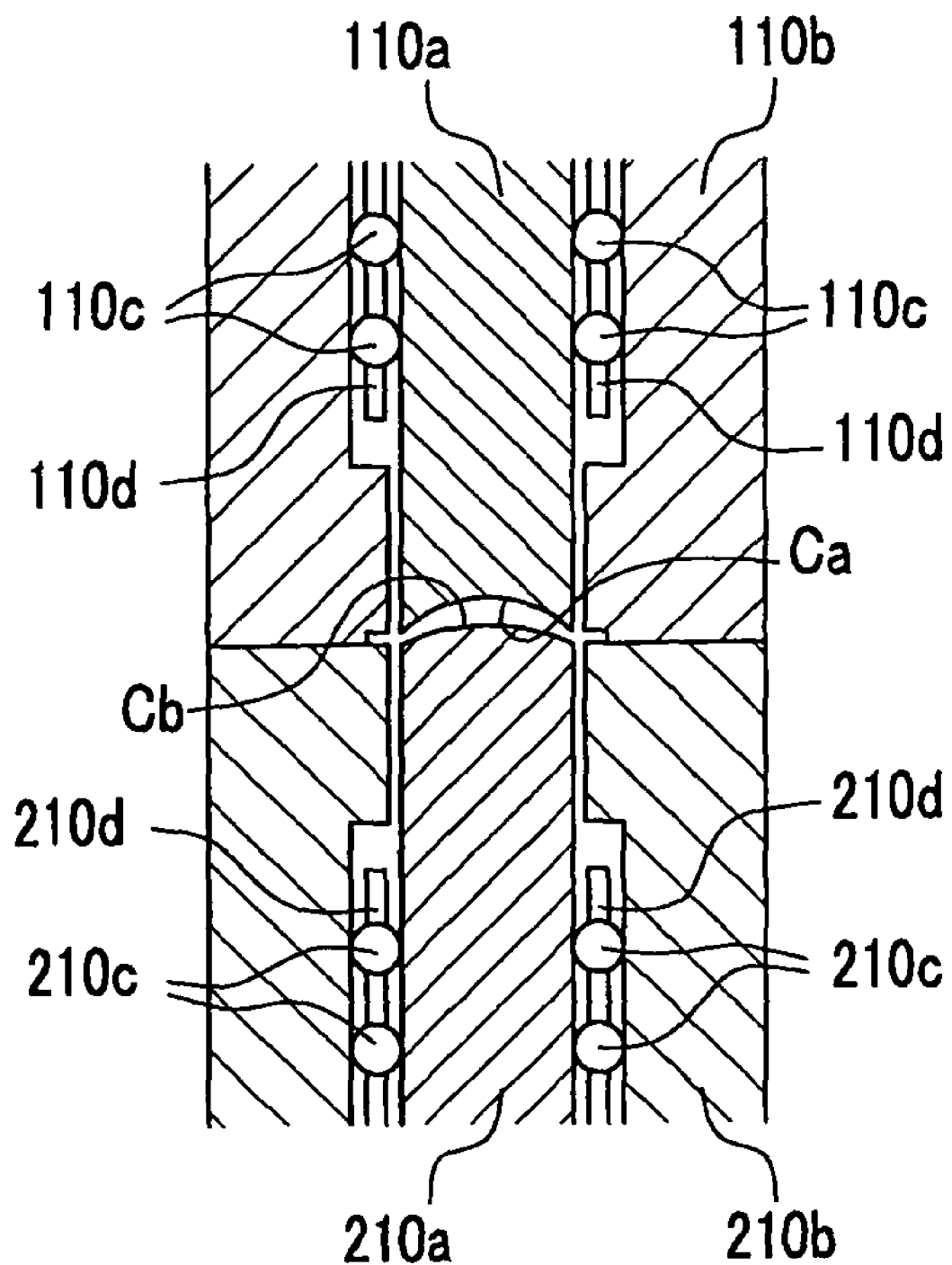
FIG. 6 is a cross sectional view showing a mold having another configuration according to the first embodiment, in which an insertion part is divided.

In the first embodiment, each of the first and second dies 110, 210 is monolithic. However, as shown in the cross sectional view of FIG. 6, each of the first and second dies 110, 210 can be divided into a central first die 110a and a central second die 210a for molding an optical surface of a lens and an outer first die 110b and an outer second die 210b for molding a flange of the lens, respectively, with the central first die 110a and the central second die 210a inserted into the tubular-shaped outer first die 110b and the outer second die 210b respectively. In this configuration, the center axis alignment is performed by interposing a plurality of spherical members 110c, 210c, and retainers 110d, 210d for holding the spherical members 110c, 210c respectively, between the central first die 11a and the central second die 210a and the outer first die 110b and the outer central second die 210b. After the mold 1 is opened, the outer first die 110b and the outer central second die 210b are slid and protruded with respect to the central first die 110a and the central second die 210a respectively to thereby demold the lens from the cavity surfaces Ca, Cb of the central first die 11a and the central second die 210a.

Second Embodiment

Next is described a configuration of a mold according to the second embodiment.

Figure 7A:
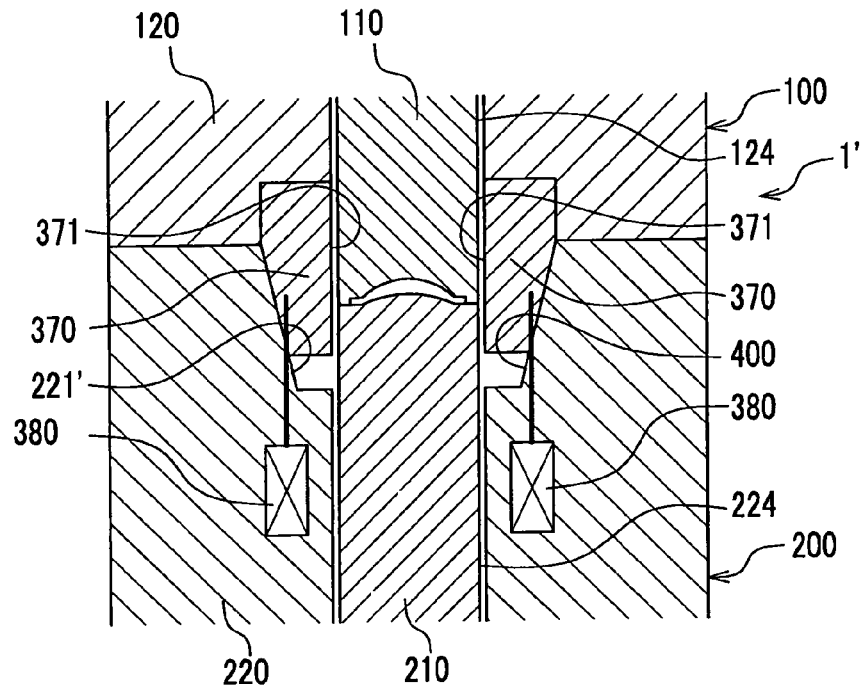
FIGS. 7A and 7B are views each showing a mold according to a second embodiment of the present invention.
Figure 7B:
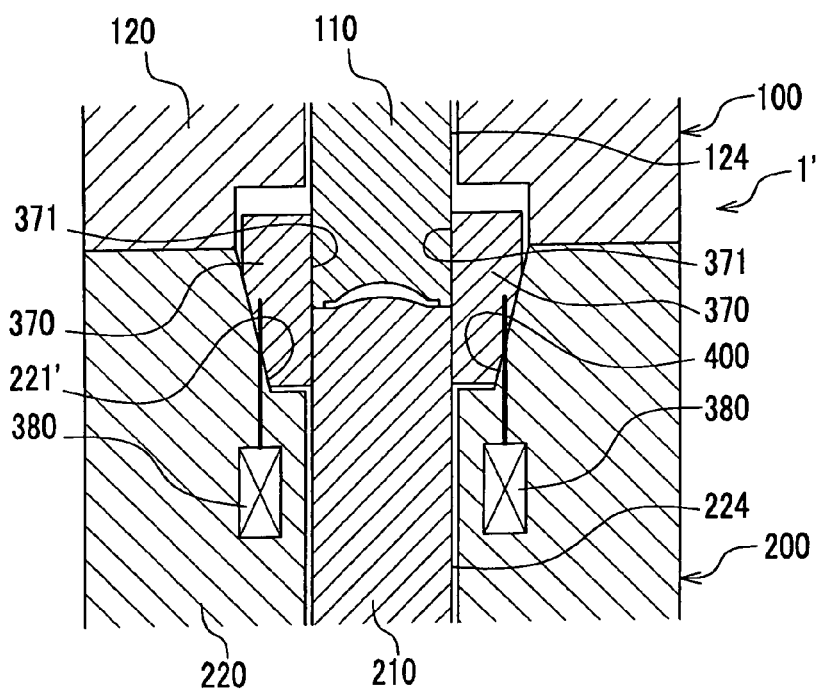

FIG. 7A and FIG. 7B are views each showing a mold according to a second embodiment of the present invention. FIG. 7A is a plan view showing the mold before a center axis alignment is performed. FIG. 7B is a cross sectional view showing the mold after the center axis alignment is performed.

A mold 1' according to the second embodiment has substantially the same configuration as the mold 1 according to the first embodiment shown in FIG. 2A, except that the configurations for moving aligning members are different.

The configuration of the mold 1' according to the second embodiment is such that, as shown in FIG. 7A, a force in the mold opening/closing direction is applied to each of aligning members 370, namely, a force in parallel with the outer circumferential surfaces 124, 224 of the first and second dies 110, 210 is applied thereto (see FIG. 7B). Thus a tapered face 400 is provided around the first and second dies 110, 210 for guiding each of the aligning members 370 toward the outer circumferential surfaces 124, 224 of the first and second dies 110, 210. Each of the aligning members 370 otherwise tends to move in the mold closing direction.

The tapered face 400 has an inverted conic surface formed around a lower end of the first die 110 of the first half 100 and an upper end of the second die 210 of the second half 200. In other words, the tapered face 400 is formed on an inner circumferential surface of a thick hole 221' of the body member 220 of the second half 200.

An outer surface (a surface to contact the tapered face 400) of each aligning member 370 has a tapered face corresponding to the tapered face 400, so that each aligning member 370 can slide on the tapered face 400 in the vertical direction. It is to be noted that the driving unit 380 for moving each aligning member 370 is not limited to the one according to this embodiment, nor to the first embodiment. In this embodiment, the driving unit 380 provided in the second half 200 pulls each aligning member 370 downward, when the mold 1' is closed.

As shown in FIG. 7B, when the driving unit 380 pulls each aligning member 370 downward, each aligning member 370 slides along the tapered face 400, and moves toward the outer circumferential surfaces 124, 224 of the first and second dies 110, 210. Then each contact surface 371 of the aligning members 370 contacts the outer circumferential surfaces 124, 224 of the first and second dies 110, 210. This enables the center axis alignment between the first and second dies 110, 210 to thereby achieve the center axis alignment therebetween.

A width of the mold 1' according to the second embodiment can be made smaller, because the tapered face 400 is provided. Though a force is applied to each aligning member in the mold closing direction in parallel with the outer circumferential surfaces 124, 224 of the first and second dies 110, 210, the tapered face 400 guides each aligning member 370 toward the outer circumferential surfaces 124, 224 of the first and second dies 110, 210,. This is particularly advantageous when a plurality of the molds 1' are arranged, allowing an increase in the number of the molds 1' which can be arranged in a given area.

The second embodiment according to the present invention has been described above in detail with reference to the related drawings, but the present invention is not limited to the second embodiment, and, like in the first embodiment, can be modified according to the necessity without departing from the gist of the present invention.

For example, in the second embodiment, as shown in FIG. 7A, the tapered face 400 in an inverted conic shape is formed around the first and second dies 110, 210. However, a plurality of planar tapered faces can be formed around the first and second dies 110, 210 for guiding each aligning member 370 which is pulled downward by the driving unit 380.

For example, in the second embodiment, as shown in FIG. 7A, the tapered face 400 in a conic shape is formed on the entire inner circumferential surface of the thick hole 221'. However, the tapered face 400 in a conic shape can be formed only in a lower part of the thick hole 221', and an upper part of the same can be made into a vertical surface.

In the second embodiment, the tapered face 400 in an inverted conic shape is formed in the thick hole 221' on the second half 200. However, the tapered face 400 in a conic shape can be formed on the first half 100, and the first half 100 can be provided with aligning members to slide on the tapered face 400.

In the second embodiment, the driving unit 380 provided in the second half 200 pulls each aligning member 370. However, the driving unit 380 can be provided in the first half 100 so as to push each aligning member 370 outward.

Figure 8:
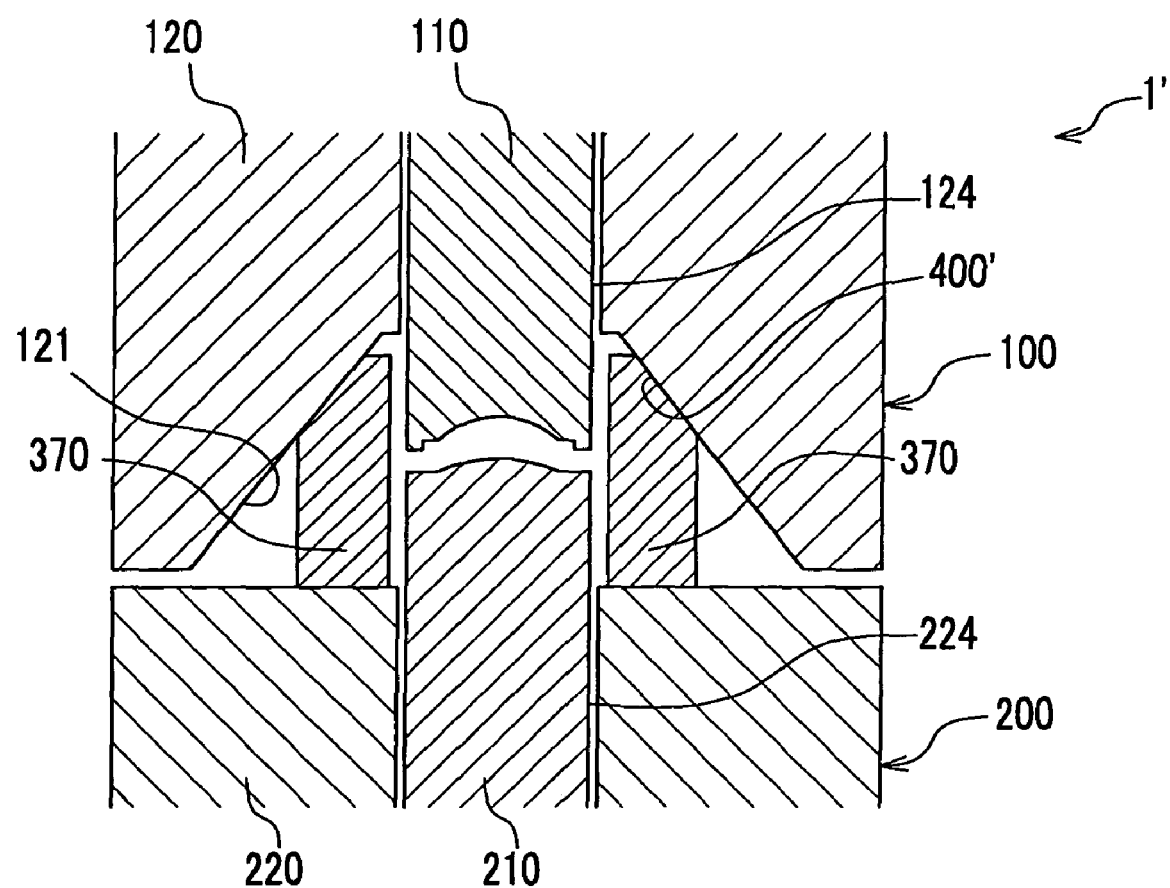
FIG. 8 is a cross sectional view showing a mold having another configuration according to the second embodiment, in which the aligning members are pushed by closing the mold.

As shown in FIG. 8, a conic-shaped tapered face 400' can be formed on an inner circumferential side surface, so that, when the first half 100 is moved downward upon closing the mold 1', each aligning member 370 slides on the tapered face 400' to be thereby pushed toward the outer circumferential surfaces 124, 224 of the first and second dies 110, 210. This enables each aligning member 370 to contact the outer circumferential surfaces 124, 224 of the first and second dies 110, 210 without requiring an additional driving unit for moving each aligning member 370.

In the second embodiment, as shown in FIG. 7A, one aligning member 370 is provided with one dedicated driving unit 380. However, one common driving unit can move a plurality of the aligning members 370. Further, in a configuration in which one mold 1' has a plurality of the first and second dies 110, 120, one driving unit can move all the aligning members 370 provided in a plurality of the first and second dies 110, 120.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:

1. A mold dividable into a first half and a second half for molding a product in a cavity formed by closing the mold, comprising:

the first half comprising a first die which is inserted thereinto and is cylindrical, and the second half comprising a second die which is inserted thereinto and is cylindrical, and has a diameter the same as a diameter of the first die, the first die and the second die joined together to form a surface of the cavity, and at least three aligning members, wherein, when the mold is closed, at least one of aligning member is moved toward side circumferential surfaces of the first die and the second die to simultaneously contact the side circumferential surfaces of the first die and the second die , and the at least three aligning members sandwich the first die to the second die and achieve a center axis alignment between the first die and the second die.

2. A mold dividable into a first half and a second half for molding a product in a cavity formed by closing the mold, comprising:

the first half comprising a first die which is inserted thereinto and is cylindrical, and the second half comprising a second die which is inserted thereinto, is cylindrical, and has a diameter same as a diameter of the first die, the first die and the second die joined together to form a surface of the cavity; and at least three aligning members., wherein at least one of the aligning members is moved toward side circumferential surfaces of the first die and the second die to simultaneously contact the side circumferential surfaces of the first die and the second die, and the at least three aligning members sandwich the first die to the second die to achieve a center axis alignment between the first die and the second die and wherein each of the aligning members moves in a vertical direction with respect to a moving direction of the first die and the second die.

3. The mold according to claim 1, wherein each of the aligning members has a tapered face for guiding each of the aligning members toward the respective side circumferential surfaces of the first die and the second die to slide each of the aligning members along the tapered face to contact each of the aligning members with the respective side circumferential surfaces of the first die and the second die.

4. The mold according to claim 2, wherein each of the aligning members has a tapered face for guiding each of the aligning members toward the respective side circumferential surfaces of the first die and the second die to slide each of the aligning members along the tapered face to contact each of the aligning members with the respective side circumferential surfaces of the first die and the second die.

* * * * *